United States Patent [19]

Bona et al.

[11] Patent Number: 4,782,218
[45] Date of Patent: Nov. 1, 1988

[54] READOUT AND OBLITERATION HEAD PARTICULARLY FOR MAGNETIC CARDS

[75] Inventors: Cesare Bona; Achille Castelli, both of Arona, Italy

[73] Assignee: Ages Italia SpA, Borgo Ticino, Italy

[21] Appl. No.: 882,329

[22] Filed: Jul. 7, 1986

[30] Foreign Application Priority Data

Jul. 11, 1985 [IT] Italy .................................. 21527 A/85

[51] Int. Cl.$^4$ ............................................. G06K 5/00
[52] U.S. Cl. ..................................... 235/449; 235/445; 235/380
[58] Field of Search ............... 235/449, 445, 380, 375; 360/2

[56] References Cited

U.S. PATENT DOCUMENTS

| | | | |
|---|---|---|---|
| 4,024,379 | 5/1977 | Pfost et al. ...................... | 235/449 X |
| 4,061,967 | 12/1977 | Hall ................................ | 235/449 X |
| 4,185,730 | 1/1980 | Roes et al. ....................... | 235/449 X |
| 4,370,550 | 1/1983 | Sidline ............................. | 235/449 |
| 4,536,648 | 8/1985 | Kruse et al. ..................... | 235/449 X |

FOREIGN PATENT DOCUMENTS 172584 2/1986 European Pat. Off. ............ 235/449

Primary Examiner—Philip H. Leung
Attorney, Agent, or Firm—Guido Modiano; Albert Josif

[57] ABSTRACT

This readout and obliteration head comprises, on a load-bearing frame, an entry for a magnetic card in communication with a channel receiving a portion of the magnetic card. A magnetic card readout and obliteration assembly is supported in the frame and is connected to a first motor for translating to and away from the channel and therefore an inserted magnetic card and to a second motor for rotating the assembly with respect to the card and effectuation of readout and obliteration of the card. The head further comprises a centering and locking pin driven by the first motor for locking the card during readout and obliteration of card.

5 Claims, 2 Drawing Sheets

4,782,218

READOUT AND OBLITERATION HEAD PARTICULARLY FOR MAGNETIC CARDS

BACKGROUND OF THE INVENTION

This invention relates to a readout and obliteration head particularly for magnetic cards.

As is known, so-called magnetic cards, as currently utilized in many fields, have at least one magnetic portion carrying information, possibly coded information, to enable the user to enjoy a variety of facilities.

Such magnetic cards require, for readout of the stored information, a special machine which generally disallows displaying on the card itself that a particular facility has been enjoyed or of the still enjoyable facilities.

This factor has represented heretofore a limitation to the use of magnetic cards to make so-called point cards, which are used, for example, at skiing premises, where each premise is enjoyable by the annulment of a given number of points, because the absence of a clear, readable writing of the enjoyed points is not well accepted by the user who cannot openly realize how many points are still left for use.

Furthermore the lack of a readable writing of the used up points may give rise to disputes in the event of incidental or fraudolent tampering with the magnetic zone.

SUMMARY OF THE INVENTION

It is indeed the object of this invention to obviate such prior drawbacks by providing a readout and obliteration head particularly for magnetic cards of the type forming the subject matter of French Patent Application No. 85 17 367filed on Nov. 25, 1985 by this same applicant, disclosing a card which has a plate-like element provided with a through-hole surrounded by a magnetic zone of annular shape, in turn surrounded by an annular portion wherein a hard copy write-in or visible obliteration may be effected.

A particular object of this invention is to provide a readout and obliteration head wherein the card is not fully inserted into the machine, thus leaving at all times a visible portion, but allowing at the same time locking of the card inside the machine to prevent erroneous withdrawals during the readout or obliteration phase of the card from resulting in erroneous operation.

Also an object of this invention is to provide a readout and obliteration head which has a simplified construction and very compact overall dimensions which facilitate its installation and its connection to the machine which handles the information and imparts the various commands.

A further object of this invention is to provide a readout and obliteration head which affords simplification of all the obliteration and readout operations, thus facilitating its use by users which generally comprise unskilled persons and who consequently should not be subjected to effectuation of complicated operations.

A not least object of this invention is to provide a readout and obliteration head, particularly for magnetic cards which is easily obtainable from commercially readily available materials, and which is advantageous from a purely economical standpoint.

These and other objects to become apparent hereinafter are achieved by a readout and obliteration head, particularly for magnetic cards, according to the invention, comprising on a load bearing frame, an entry for inserting a magnetic card in communication with a channel for receiving a portion of said magnetic card, a readout and obliteration assembly in said channel, first motor means connected to and moving said readout and operation assembly toward and away from said channel, second motor means connected to and rotating said assembly with respect to said channel, and a centering and locking pin for said card, driven by said first motor means.

BRIEF DESCRIPTION OF THE DRAWINGS

Further features and advantages will be apparent from the description of a preferred but not exclusive embodiment of a readout and obliteration head particularly for magnetic cards, shown by way of illustration and not of limitation in the accompanying drawings where:

FIG. 4 is a plan view of the head sectioned along the line IV—IV of FIG. 1; and

FIG. 5 is a plan view of the head during the rotation of the readout and obliteration assembly.

DESCRIPTION OF THE PREFERRED EMBODIMENTS

Figure 1:
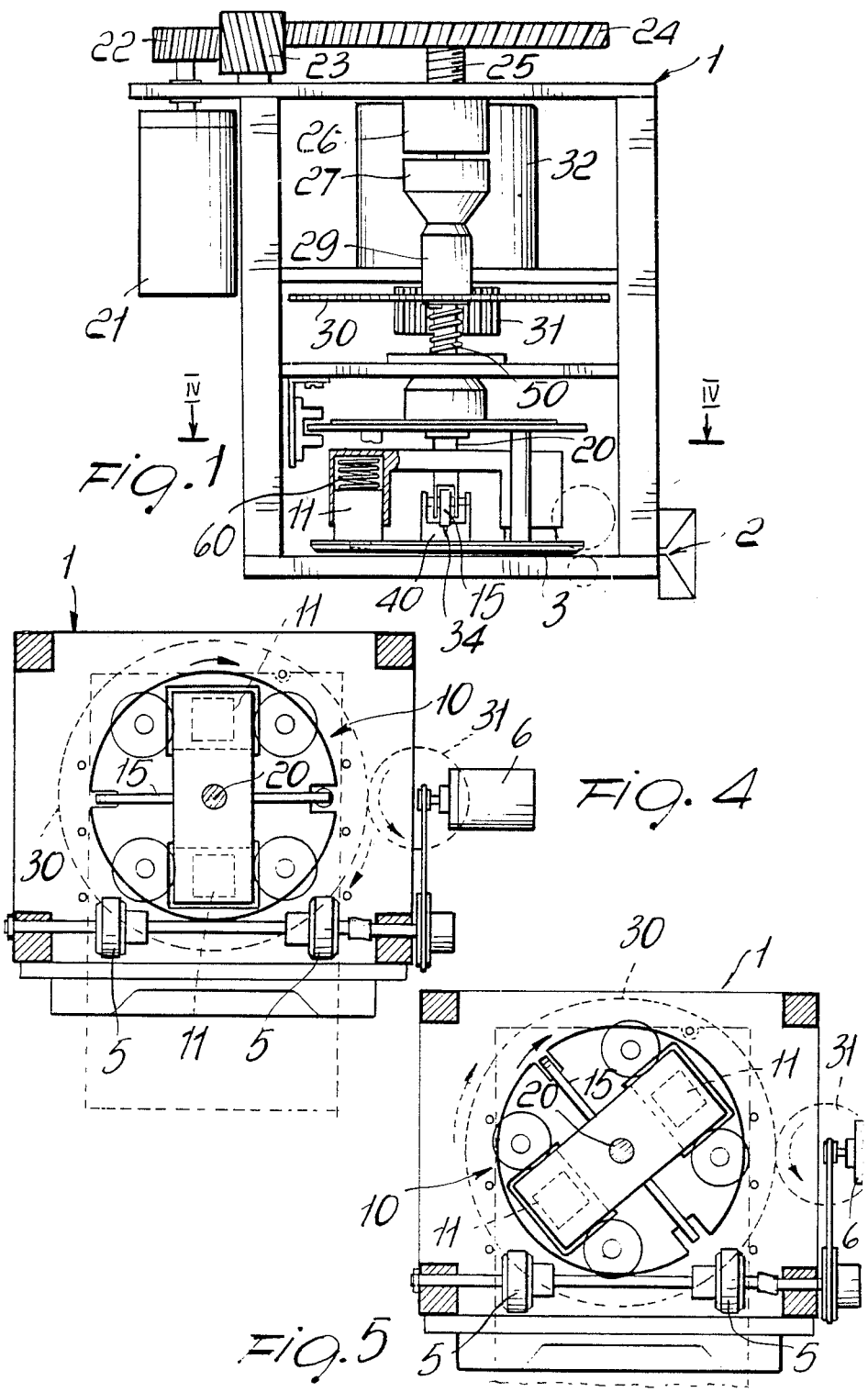
FIG. 1 is a side elevation view of the head according to the invention.
Figure 2:
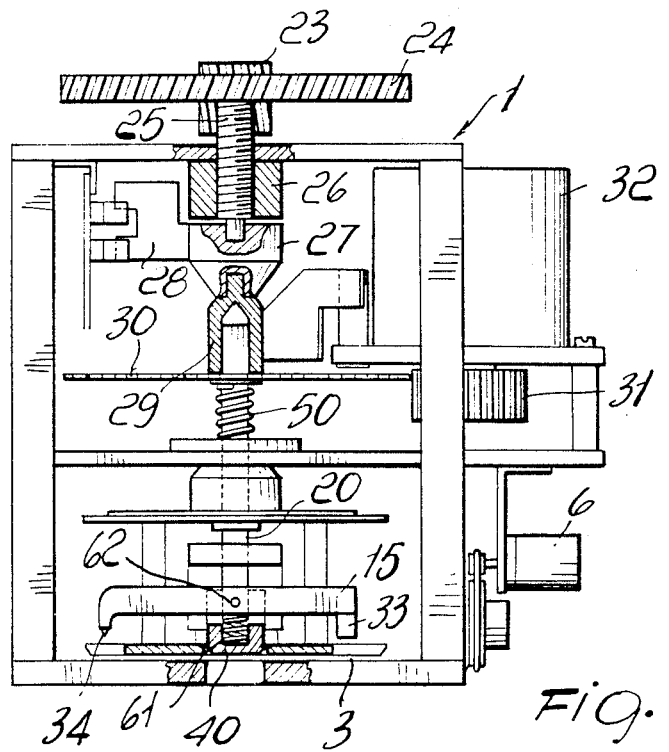
FIG. 2 is a part-sectional front view of the head.
Figure 3:
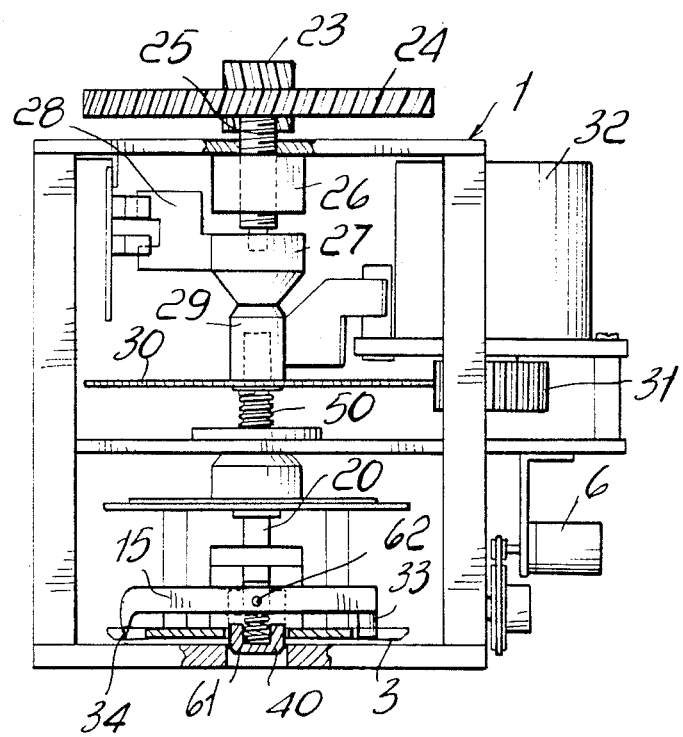
FIG. 3 is a front view of the head with the readout and obliteration assembly in its working position.

With reference to the cited figures, the readout and obliteration head particularly for magnetic cards, according to the invention, comprises a load-bearing frame, generally designated with the reference numeral 1, which defines frontally an entry 2 for inserting a magnetic card, preferably of the type illustrated in the above cited French Patent application No. 85 17367.

The entry 2 opens into a channel 3 which is so structured and dimensioned as to receive a portion of the card, whilst a portion of the card is left outside and accessible from the outside.

At the entry 2 automatic entrainment means for the card are provided, consisting of small rollers 5 driven by a small motor 6 which is driven by position sensors, as already known in the art.

Inside the frame 1 a card readout and obliteration assembly 10 is provided, which has advantageously a pair of magnetic heads 11 supported in the frame 1 so as to vertically and axially slide against pressure springs 60 pressing the heads 11 toward the channel 3 and having the function, as explained hereinafter, of adequating the heads to the magnetic track to be read.

The assembly 10 has then an obliteration lever 15 which will be described hereinafter.

The obliteration assembly 10 is connected to a vertical axle 20 which is axially movable by the action of first motor means 21 which, through a first gear wheel 22 and a transmission gear wheel 23, transmit the motion to a ring gear 24 having a central threaded pin 25 rotatably engaging with a nut screw 26 rigidly associated with the load-bearing structure 1.

The threaded pin 25 engages in an intermediate block 27, not rigid rotatively with the pin 25, which is provided with a translation detecting wing 28.

The intermediate body 27 is translatorily associated with a fitting 29 which rotatably engages with the axle 20.

The axle 20 rigidly carries a gear wheel 30 meshing with a small pinion 31 allowing an axial sliding movement of the wheel 30 and rigidly associated with second motor means consisting of a step motor 32 which has the function of effecting rotation of the readout and obliteration assembly 10.

The small step motor 32 has the function of effecting programmed rotations of the vertical shaft 20 with consequent rotation of the readout and obliteration assembly.

The obliteration lever 15, journalled to the shaft 20, at a middle portion thereof, has at one end a rest foot 33, and at the other end a dry obliteration tip 34.

Descent of the shaft 20, as will be explained hereinafter, causes the lever 15 to oscillate with consequent dry obliteration of the magnetic card by the tip 34.

On its lower end, the shaft 20 has a centering and locking pin 40 which is connected to the shaft itself with the interposition of elastic damping means 61 and of a peg 62 which allows it to perform a limited travel and oscillation so as to avoid forcing the card.

In actual use it occurs that, when the user places the card at the entry 2, the card entrainment means 5 is operated which acts automatically to insert into the channel 3 a preset portion of the card.

Once the card has been inserted, the first motor means 21 is automatically operated so as to bring about the descent of the shaft 20 and consequently of the centering and locking pin 40 as well as of the readout and obliteration assembly 10. The pin 40 has the function of exactly positioning the card and preventing its undue withdrawal from the head during the effectuation of the readout phase.

Once the magnetic heads contact the magnetic track, readout is effected during the rotation of the assembly 10 (see FIGS. 4 and 5) controlled by means of the step motor 32 and the coupling gear wheel 30. Thereby the required readouts are effected according to a preset program and in a per se known manner. During the phase of obliteration of the card, which obliteration is carried out both magnetically, by annulling the desired number of points, and visually, it occurs that the first motor means 21 still perform a limited downward translation of the shaft 20 with consequent visual obliteration of the enjoyed card points.

Where instead of the point card the magnetic card is a daily type one, the obliteration operations are only effected at the time of first use and consist of indicating the starting day or the validity period of the card.

After effecting the readout and obliteration operations, the assembly 10 is caused to move back upward away from the card receiving channel with consequent disengagement of the pin 40 from the hole provided in the magnetic card, by the action of the return spring 50. Simultaneously the step motor 32 is operated to bring back the magnetic readout heads 11 at the preset starting position.

From the foregoing description it may be seen that the invention achieves its objects and in particular it is pointed out that this apparatus allows in succession locking in a preset position of the card, exact positioning of the readout means, readout and obliteration of the card, while holding the card locked in a position such that at least one portion of the card is accessible from the outside, thereby the card is never fully removed from the user.

Another important aspect of the invention is then that the expedients adopted prevent erroneous uses of the cards, since the user is merely required to position the card at the entry and cannot, in any way, perform operations which may alter proper operation of the machine.

The invention herein is susceptible to many modifications and variations within the scope of the inventive concept.

Furthermore, all of the details may be replaced with other technically equivalent elements.

In practicing the invention the materials used, so long as compatible with the specific use, and the dimensions and contingent shapes may be any ones according to necessity.

We claim:

1. A readout and obliteration head, particularly for magnetic cards, comprising a load bearing frame, an entry in said load bearing frame for allowing insertion of a magnetic card, a channel in said load bearing frame in communication with said entry for receiving a portion of the magnetic card, a substantially vertical shaft carried on and axially and rotatably movable in said load bearing frame, a movable readout and obliteration assembly supported by said shaft in said load bearing frame, first motor means carried on said load bearing frame, said first motor means being connected to said shaft for moving said shaft and said readout and obliteration assembly toward and away from said channel, second motor means carried on said load bearing frame, said second motor means being connected to said shaft for rotating said shaft and said readout and obliteration assembly with respect to said channel, and a centering and locking pin movably carried on said load bearing frame and connected to said first motor means to be brought in and away from said channel for centering and locking said magnetic card in said channel, wherein said readout and obliteration assembly comprises an obliteration lever having a first and a second opposite ends and a middle portion, said lever being journalled at said middle portion to said shaft and having at said first end a rest foot and at said second end a dry obliteration tip, said lever being pushed against the magnetic card, resting downwardly with said rest foot and impressing a dry mark on the magnetic card on translation downwardly of said shaft.

2. A readout and obliteration head, particularly for magnetic cards, comprising a load bearing frame, an entry in said load bearing frame for allowing insertion of a magnetic card, a channel in said load bearing frame in communication with said entry for receiving a portion of the magnetic card, a substantially vertical shaft carried on and axially and rotatably movable in said load bearing frame, a movable readout and obliteration assembly supported by said vertical shaft in said load bearing frame, an intermediate body connected to an upper end of said vertical shaft, a nut screw rigidly connected to said load-bearing frame, a threaded pin rotatably engaging in said nut screw and engaging with said intermediate body for moving said vertical shaft and said readout and obliteration assembly toward and away from said channel, first motor means carried on said load bearing frame, said first motor means being connected to and rotating said threaded pin, second motor means carried on said load bearing frame, said second motor means being connected to said vertical shaft for rotating said vertical shaft and said readout and obliteration assembly with respect to said channel, and a centering and locking pin movably carried on said load bearing frame and connected to said first motor means to be brought in and away from said channel for centering and locking said magnetic card in said channel, wherein said readout and obliteration assembly comprises an obliteration lever having a first and a second opposite ends and a middle portion, said lever being journalled at said middle portion to said vertical shaft and having at said first end a rest foot and at said second end a dry obliteration tip, said lever being pushed against the magnetic card, resting downwardly with said rest foot and impressing a dry mark on the magnetic card on translation downwardly of said vertical shaft.

3. A readout and obliteration head, according to claim 2, further comprising a ring gear rigidly connected to said threaded pin and meshing with a transmission gear wheel in turn meshing with a further gear wheel rigidly connected to said first motor means.

4. A readout and obliteration head, according to claim 2, wherein said second motor means comprises a step motor driving a small pinion meshing with a gear wheel rotatively rigid with said vertical shaft supporting said readout and obliteration assembly.

5. A readout and obliteration head, according to claim 2, wherein said centering and locking pin is connected to a bottom end of said vertical shaft supporting said readout and obliteration assembly with the interposition of elastic damping means and a swivel element.

* * * * *